(12) United States Patent
Albulet et al.

(10) Patent No.: US 7,664,537 B2
(45) Date of Patent: Feb. 16, 2010

(54) PERFORMANCE AND EFFICIENCY OF WIRELESS DEVICES

(75) Inventors: Mihai Albulet, Redmond, WA (US);
Peter E. H. Hauser, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 740 days.

(21) Appl. No.: 11/298,571

(22) Filed: Dec. 12, 2005

(65) Prior Publication Data

US 2007/0135178 A1 Jun. 14, 2007

(51) Int. Cl.
*H04M 1/00* (2006.01)
*H04B 1/38* (2006.01)

(52) U.S. Cl. .................... 455/574; 455/550.1
(58) Field of Classification Search .......... 455/574
See application file for complete search history.

(56) References Cited

U.S. PATENT DOCUMENTS

| | | | |
|---|---|---|---|
| 3,878,488 A * | 4/1975 | Blythe et al. ............ 334/39 |
| 4,672,541 A | 6/1987 | Bromley | |
| 5,276,680 A | 1/1994 | Messenger | |
| 5,607,356 A | 3/1997 | Schwartz | |
| 5,717,425 A | 2/1998 | Sasaki | |
| 5,812,117 A | 9/1998 | Moon | |
| 5,854,621 A | 12/1998 | Junod | |
| 6,661,410 B2 | 12/2003 | Casebolt | |
| 6,760,453 B1 * | 7/2004 | Banno ................ 381/107 |
| 6,807,159 B1 | 10/2004 | Shorey et al. | |
| 2002/0149569 A1 | 10/2002 | Dutta | |
| 2003/0033288 A1 | 2/2003 | Shanahan | |
| 2003/0134657 A1 | 7/2003 | Norta et al. | |
| 2003/0140136 A1 * | 7/2003 | Nakamura ............ 709/224 |
| 2003/0190938 A1 | 10/2003 | Ganton | |
| 2004/0003307 A1 | 1/2004 | Tsuji | |

(Continued)

FOREIGN PATENT DOCUMENTS

GB 2384944 1/2002

(Continued)

OTHER PUBLICATIONS

Shinji Mikami, et al., "A Wireless-Interface SoC Powered by Energy Harvesting for Short-range Data Communication", In: Proceedings of 2005 Asian Solid-State Circuit Conference, Nov. 2004, pp. 241-244.

(Continued)

*Primary Examiner*—Yuwen Pan
*Assistant Examiner*—Ankur Jain
(74) *Attorney, Agent, or Firm*—Senniger Powers LLP

(57) ABSTRACT

A wireless input device may negotiate a predefined transmit/receive schedule with a receiving device (i.e., PC, PDA, cellular device). To conserve power, the wireless components of the input device are powered down during periods of non-transmission. The wireless input device detects intermediate user input and corresponding data according to a detection rate during periods of non-transmission. The intermediate data is then transmitted to the receiving device during a transmission period along with a current data detected at the time of transmission. The wireless device may further discard any intermediate data which does not reflect a significant change. Additionally, the system and method may include a detection rate that adapts to degrees of user activity detected by the wireless input device.

14 Claims, 9 Drawing Sheets

U.S. PATENT DOCUMENTS

| | | | |
|---|---|---|---|
| 2004/0003311 A1* | 1/2004 | Jones | 713/320 |
| 2004/0008255 A1 | 1/2004 | Lewellen | |
| 2004/0189603 A1 | 9/2004 | Arrigo | |
| 2004/0212590 A1 | 10/2004 | Koo | |
| 2005/0066208 A1 | 3/2005 | Koie et al. | |

FOREIGN PATENT DOCUMENTS

| | | |
|---|---|---|
| KR | 1020040085628 | 10/2004 |
| WO | WO2004038938 | 5/2004 |

OTHER PUBLICATIONS

Paul Yao, "Add Support for Digital Ink to Your Windows Applications", MSDN Magazine, Dec. 2004, 16 pages.

International Search Report for International Application No. PCT/US2006/044741 completed Apr. 3, 2007.

International Search Report for International Application No. PCT/US06/16230 completed Feb. 27, 2007.

International Search Report for International Application No. PCT/US2006/043943 completed Apr. 18, 2007.

International Search Report for International Application No. PCT/US06/15187 completed Mar. 6, 2007.

Joel Linsky, "Bluetooth and Power Consumption: Issues and Answers", printed from www.rfdesign.com, pp. 74-95, Nov. 2001.

Haartsen and Mattisson, "Bluetooth—A New Low-Power Radio Interface Providing Short-Range Connectivity", IEEE Proceedings of the IEEE, vol. 88, No. 10, Oct. 2000, pp. 1651-1661.

Cheung and Luong, "A 1-V 10-m Monolithic Bluetooth Receiver in a 0.35-μm CMOS Process", printed from http://www.imec.be/esscirc/essderc-2003/papers/all/379.pdf, 2003, 4 pages.

* cited by examiner

| Slot # | 1 | 2 | 3 | 4 | ... | 16 | 17 | 18 | 19 | 20 | ... |
|---|---|---|---|---|---|---|---|---|---|---|---|
| Receive Device | Tx (Poll) | Rx | Tx (Null) | Rx | ... | Rx | Tx (Poll) | Rx | Tx (Null) | Rx | ... |
| Input Device | Rx | Data | Rx | OFF | ... | OFF | Rx | Data | Rx | OFF | ... |

FIG. 3

PERFORMANCE AND EFFICIENCY OF WIRELESS DEVICES

BACKGROUND

In response to an increasing desire for mobility and unrestricted movement in the realm of computing, various wireless technologies have evolved including transmission protocols such as BLUETOOTH, the various IEEE 802.11 standards, various proprietary protocols, and HomeRF. Such protocols have enabled peripherals to achieve wireless capabilities that alleviate many of the obstacles presented by corded devices. Wireless input devices are often used to control navigation and interaction with a user interface. Such interaction and navigation is facilitated, for example, by the implementation of a tooltip, cursor or other pointing tool in a user interface that tracks the status (e.g., motion) of the wireless device. Many input devices are also used to control game play and user data entry that are time-dependent. For example, in first-person shooter games, a player controls character movement and actions (e.g., firing a gun) by pressing the predefined buttons or keys.

The use of wireless input devices has grown tremendously in many facets of computing. Due to wireless device dependency on batteries as a source of power, however, improving and extending battery life and performance has also developed significant importance. In many cases, however, there are inherent limitations exist when attempting to balance power consumption and device performance. As such, many wireless devices compromise either battery life or device performance in order to improve or maintain the other.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In at least some embodiments, various aforementioned problems are addressed by a method and system for modifying the performance and improving the energy efficiency of a wireless input device. By increasing the amount of data that is transmitted during transmission periods, a wireless device, according to at least some embodiments, lowers report rates without perceptibly reducing the wireless input device's effectiveness. For example, a wireless input device may transmit at least twice the amount of data during a transmission period as is reported with current power saving techniques. By detecting and storing wireless input data (e.g., status, position) during an intermediate period of non-transmission between two transmission periods, the data is preserved for later transmission during one of those transmission periods. Although the stored intermediate data may not be reported immediately, the report rate may be selected to eliminate any perceptible latency. Such a method may thus reduce the jaggedness of a visual display that may be characteristic of other power conservation techniques.

In some embodiments, a wireless input device automatically adjusts a rate at which user input is detected and data is determined and stored during the intermediate periods of non-transmission. For example, a wireless device may lower the detection rate (i.e., determine and store less data) if a low or non-existent level of activity is detected (e.g., moving a mouse slowly or not at all). Conversely, a wireless device may increase the detection and storage rate if, for example, more significant or faster movement is detected.

BRIEF DESCRIPTION OF THE DRAWINGS

The present invention is illustrated by way of example and not by limitation in the accompanying figures in which like reference numerals indicate similar elements and in which:

FIG. 3 illustrates a transmission schedule having a report rate of 10 ms with 16 slots, each having a length of 625 μsec, according to one illustrative embodiment.

DETAILED DESCRIPTION

In the following description, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

Figure 1:
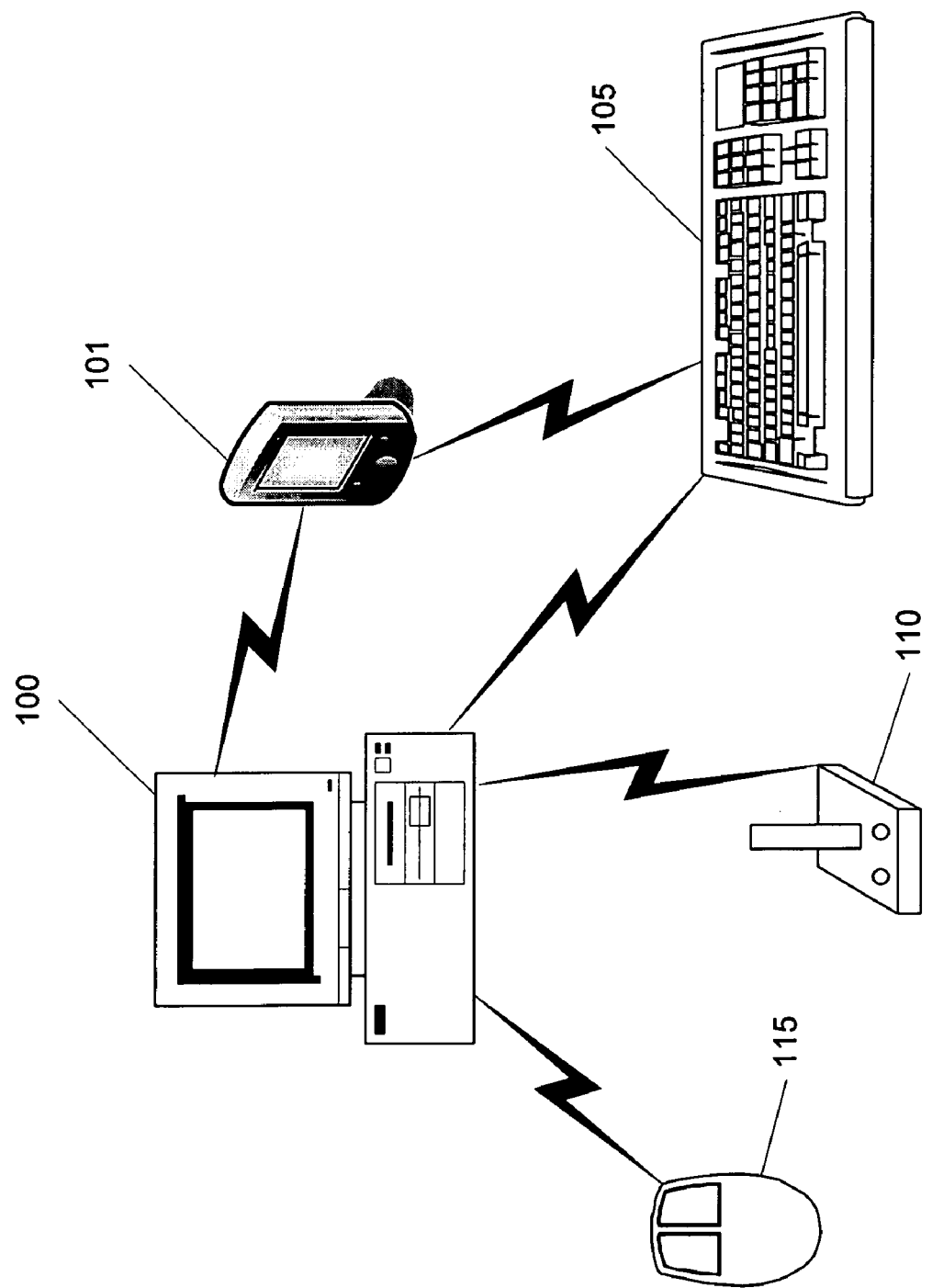
FIG. 1 illustrates a computing environment in which at least some embodiments may be implemented.

FIG. 1 illustrates a computing environment in which at least some embodiments may be implemented. A computing device such as a personal computer (PC) 100 or a personal digital assistant (PDA) 101 may include a multitude of program modules and program data. These program modules or program data may include operating systems, application programs and combinations thereof. A user may enter commands and information into computer 100 or PDA 101 through a variety of wireless input devices including a keyboard 105, a joystick 110 and a pointing device 115. Although FIG. 1 illustrates a mouse as pointing device 115, other common pointing devices in which embodiments may be implemented include trackballs and touch pads. Other input devices (not shown) may include a wireless microphone, game pad, scanner, or the like.

In computing environments like the one illustrated in FIG. 1, a pointing device 115 is often used to control the movement and actions of a user interface cursor. To affect such control, these and other input devices are often connected to computing devices 100 & 101 through wireless data connections that implement wireless transmission techniques such as BLUETOOTH and other techniques known in the art. Computing devices 100 & 101 may be connected wirelessly to one or more input devices or even to one another.

For example, PDA 101 may wirelessly transmit calendar data or e-mail information to the personal computer 100. Similarly, the personal computer 100 may provide files to the PDA 101 via wireless means. In addition, wireless input devices may communicate with each other and form a network to facilitate transmissions. For example, in BLUETOOTH implementations, two or more wireless devices may form a piconet in which one of the wireless devices acts as a master and the other BLUETOOTH devices are considered slaves. This master may thus act as a conduit and control unit for all wireless communications in the piconet.

The above describes one illustrative wireless operating environment. However, one of skill in the art will appreciate that the system and method described herein may be implemented using a variety of wireless systems and architectures.

Figure 2:
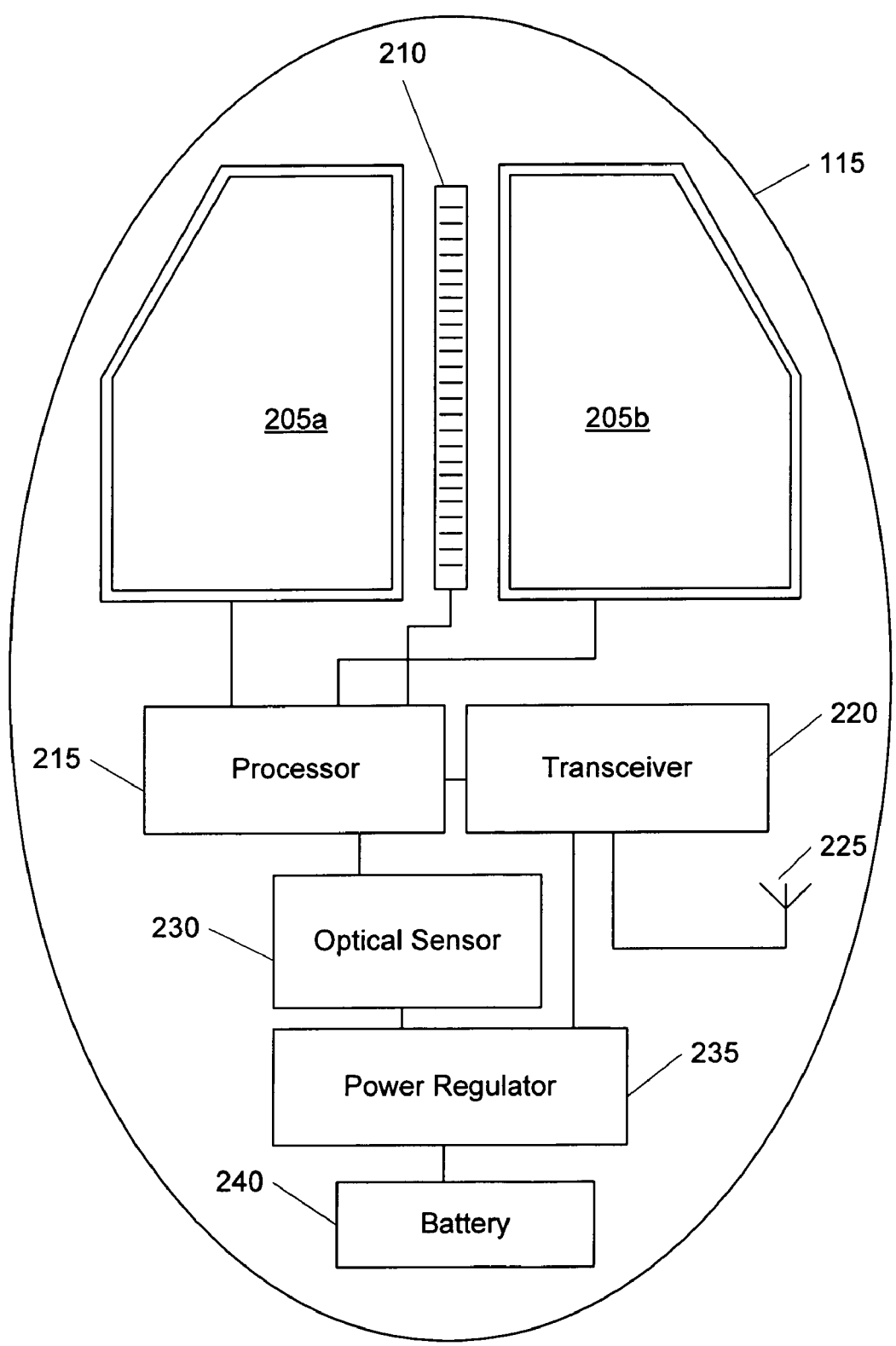
FIG. 2 illustrates a block diagram of a wireless mouse according to an illustrative embodiment.

FIG. 2 illustrates a block diagram of a wireless mouse according to at least one illustrative embodiment. A wireless mouse 115 may include a variety of user input mechanisms and interactive features such as one or more selection buttons 205*a* & 205*b* and a rotatable input component such as a mouse wheel 210. Additionally, the movement and position of the mouse 115 may also serve as a form of user input. A user may use the selection buttons 205*a* & 205*b* of a wireless mouse 115 with a graphical user interface (GUI) (such as is available in the Microsoft® Windows® operating system) to control or modify the location and appearance of any number of interface components (e.g., icons, windows). A user may also use the mouse wheel 210 to navigate through an electronic document viewed with an application such as Microsoft® Word®. The mouse wheel 210 may further be used to control a zooming feature of the display or of a particular document displayed therein. The mouse wheel 210 may include an additional feature that would permit a user to depress the wheel 210 as another potential method of input. Other input mechanisms that may be implemented in a wireless mouse 115 include a pointer nub, a gyroscopic sensor and/or a touch sensor.

Wireless mouse 115 includes several additional components including a battery 240, a power regulation unit 235, a processor 215, a transceiver 220, an optical sensor 230 (for detecting motion of device 115) and an antenna 225. Because a desired feature of many wireless input devices is mobility and unrestricted motion, a wireless input device 115 may draw power from an internal source such as a battery 240. This eliminates reliance upon corded power conduits. One of skill in the art will appreciate that many forms of batteries exist and may be used interchangeably or in combination in a wireless input device 115. For example, one implementation of a wireless mouse may include a Lithium-Ion (LiOn) battery or alternatively, alkaline batteries. The choice of battery type may depend on a variety of considerations such as cost and intended use. For example, wireless mouse 115 may use battery 240 to provide power to several components through a power regulator 235. A power regulator 235 may provide a means for controlling the voltage output to power-driven components. In one example, a power regulator 235 may draw from the battery 240 to power a transceiver 220 and an optical sensor 230. Since the transceiver 220 and optical sensor 230 may require differing levels of voltage, the power regulator 235 may insure proper power output to each of these devices. In addition, the power regulator 235 may include control logic (not shown) that determines when one or more components should be powered; in alternative embodiments, such control logic may reside within processor 215. The combination of the control logic and the power regulator 235 allows for greater flexibility in implementing power-saving techniques. In another example, the power regulator 235 and control logic may reduce power consumption by cutting power to at least a part of the transceiver 220 during periods when there is no transmission between mouse 115 and another device. In addition, lowering the frequency of transmissions may significantly reduce the power consumption of the transceiver 220 and thus, increase battery life. However, reducing the frequency of transmission could potentially lower the amount of data that is ultimately transmitted.

A transceiver 220 is typically responsible for sending and receiving data to and from other wireless-enabled devices (not shown). Such devices may include PC 100, PDA 101, a cellular communication device, another wireless input device or combinations thereof. The transceiver 220 includes an antenna 225 through which data may be transmitted and received. In one illustrative embodiment, a user uses a wireless mouse to control the movement of a tooltip in a user interface running on a PC.

Processor 215 regulates the data transmitted by transceiver 220. In so doing, the processor 215 may facilitate communications between transceiver 220 and a number of other components of mouse 115. For example, user input through the selection buttons 205*a* & 205*b* and/or mouse wheel 210 may be received and processed by the processor 215 prior to transmission. Similarly, any data related to changes in the position of the wireless mouse 115 may be determined by processor 215 via optical sensor 230. The processor 215 may receive positional data and other user input data and control operations of various components. The processor 215 may further include a storage buffer (not shown) for storing received data prior to processing and/or transmission via the transceiver 220.

User input to PC 100 or PDA 101 may be achieved through a multitude of other devices including a joystick, a touchpad, a game controller or combinations thereof. For example, a joystick may be used in a manner similar to a wireless mouse in that the movements and actions of a tooltip or other user interface indicators may be associated with movements of the joystick. In another example, the actions of a tooltip may be associated with the movements of a user's finger on a touch-sensitive touchpad or the use of cursor keys inputs on a keyboard or keypad.

Wireless mouse 115 transmits positional data (to PC 100 or PDA 101) reflecting the amount and direction by which a user has moved mouse 115 across a work surface. Such positional data may consist of an absolute device position (i.e., a set of coordinates based on two or more axes of an underlying surface) or a set of data corresponding to a relative change in position. For example, user input corresponding to a change in the position of mouse 115 may be defined by one or more changes along a first and second axis of the work surface. Ideally, an input device such as wireless mouse 115 would transmit an infinite amount of positional data so that the movement of a corresponding tooltip or cursor accurately and precisely replicated a path of motion detected by the wireless device. For various reasons such as power conservation and protocol specification requirements, however, mouse 115 operates according to a transmission schedule in which reports are periodically transmitted at a particular report rate (i.e., a transmission cycle). In BLUETOOTH protocols, for example, a negotiated report rate between a master and slave device is referred to as a SNIFF rate. Thus, the report rate, or SNIFF rate, affects the amount of positional data transmittable by the wireless input device during a given period of time. More specifically, the report rate defines the transmission schedule by specifying the number of available transmission cycles. A transmission cycle may be further defined by a period of non-transmission and a transmission period. For example, many wired input devices implement a report rate of 8 ms (i.e., 1 transmission every 8 ms) to provide 125 reports per second (1 s=1000 ms; 1000 ms/8 ms=125 reports). With such a report rate, most users will not perceive any discontinuity in screen motion of a tooltip as a mouse is moved.

A wireless device may shut down one or more of its components during the intermediate periods of non-transmission. In particular, a transmission schedule may be divided into a number of time slots of predetermined size. Certain of those time slots are used to provide a wireless input device with dedicated times for receiving and transmitting. For example, FIG. 3 illustrates a transmission cycle 300 with an exemplary report rate of 10 ms with 16 time slots of 625 μs in length. The top status row 330 corresponds to the activity and status of a receive device, or a master device, such as a PC. The bottom status row 340, on the other hand, corresponds to the activity and status of an input device, or a slave device, such as a wireless mouse.

Generally, the 625 μs slot period and the report rate are defined and controlled by the wireless (e.g., BLUETOOTH) specification. One of skill in the art will appreciate that a variety of report rates may be implemented depending on a variety of factors including intended use and power limitations. For example, some existing devices currently use report rates between 11.25 ms–20 ms. The number of time slots may be predefined or determined using the report rate and the slot length (10 ms/625 μs=16 slots of 625 μs length). The wireless components of the input device may be actively transmitting or receiving during a specified number time slots and inactive or powered down during an intermediate period of non-transmission 320 (i.e., the remaining time slots). In many current wireless implementations, 3 time slots are dedicated to receiving and transmitting so that a wireless device may receive polling inquiries during an initial time slot 305, transmit data during a second time slot 310, and receive additional data (e.g., a null indicating that the master successfully received the data or a request to retransmit data) during a third time slot 315. Additionally, current wireless techniques allow positional data corresponding to a single position or change to be sent during a given transmission period per transmission cycle. In particular, data transmitted during a particular transmission period will reflect a single change in position since the last transmission. Incremental changes in position between the two transmission periods are not separately reported using conventional techniques. Although such conventional techniques achieve a recognizable degree of power conservation, the amount of conservation that can be achieved (without noticeable performance compromise) is limited.

Figure 4:
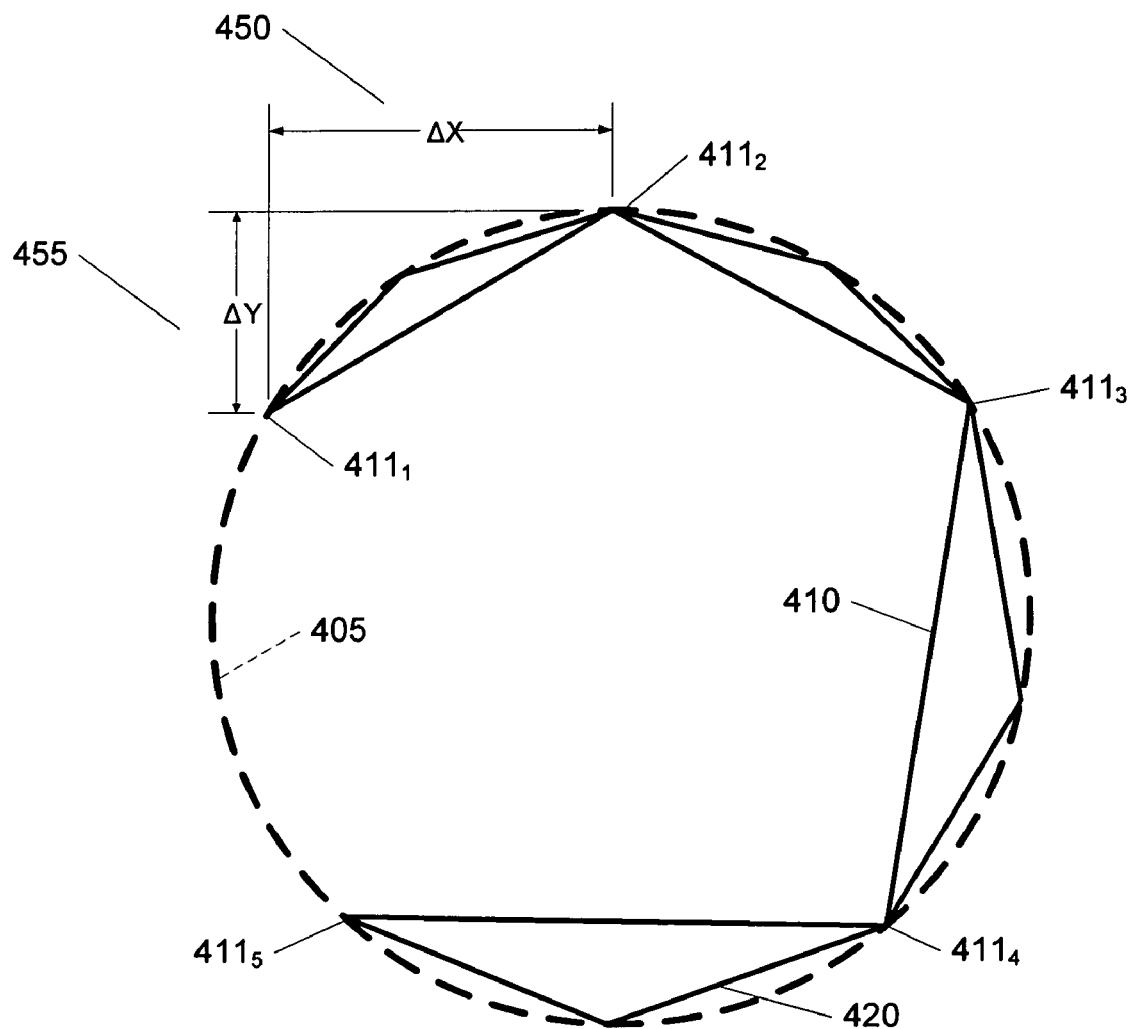
FIG. 4 is a diagram illustrating two paths of a tooltip in relation to a movement of a wireless mouse across a desktop or other surface according to an illustrative embodiment.

Those limitations are illustrated in FIG. 4, a diagram showing two paths of a tooltip in relation to a movement of mouse 115 across a desk top or other surface. Generally, a GUI or other interface includes a tooltip (e.g., a cursor) that tracks the movement or motion of a wireless input device (e.g., wireless mouse 115). More specifically, the tooltip moves along a path that approximates an actual path of motion of the wireless input device. In one example, dashed circle 405 corresponds to the actual motion path 405 of wireless mouse 115. In order to replicate the actual path 405 using conventional techniques, the wireless mouse 115, in accordance with its transmission schedule and report rate, transmits positional data corresponding to points $411_1$, $411_2$, $411_3$, $411_4$ and $411_5$. The motion from point to point (i.e., relative data) or the points themselves (i.e., absolute coordinates) may correspond to user input. In this example, points $411_1$, $411_2$, $411_3$, $411_4$ and $411_5$ represent the positions of the wireless mouse 115 during 5 consecutive transmission periods (e.g., slots 1-3 of every 16 consecutive slots, as in FIG. 3). With the positional data of a limited number of points, software on PC 100 that generates a screen display of the tooltip's path will typically approximate the motion between those points as straight lines. Motion path 410 represents the resulting tooltip path. As illustrated, the motion path 410 does not accurately follow the curvature of the actual path 405 of the wireless mouse 115. In contrast, motion path 420 more accurately approximates path 405 of wireless mouse 115. Path 420 could be generated with conventional techniques if the report rate is increased to provide additional intermediate positional data. Increasing the report rate, however, would also increase power consumption. In other words, there is a tradeoff between the accuracy of a generated motion path depicting the actual motion of a wireless device and the power consumption of the wireless input device.

Figure 5:
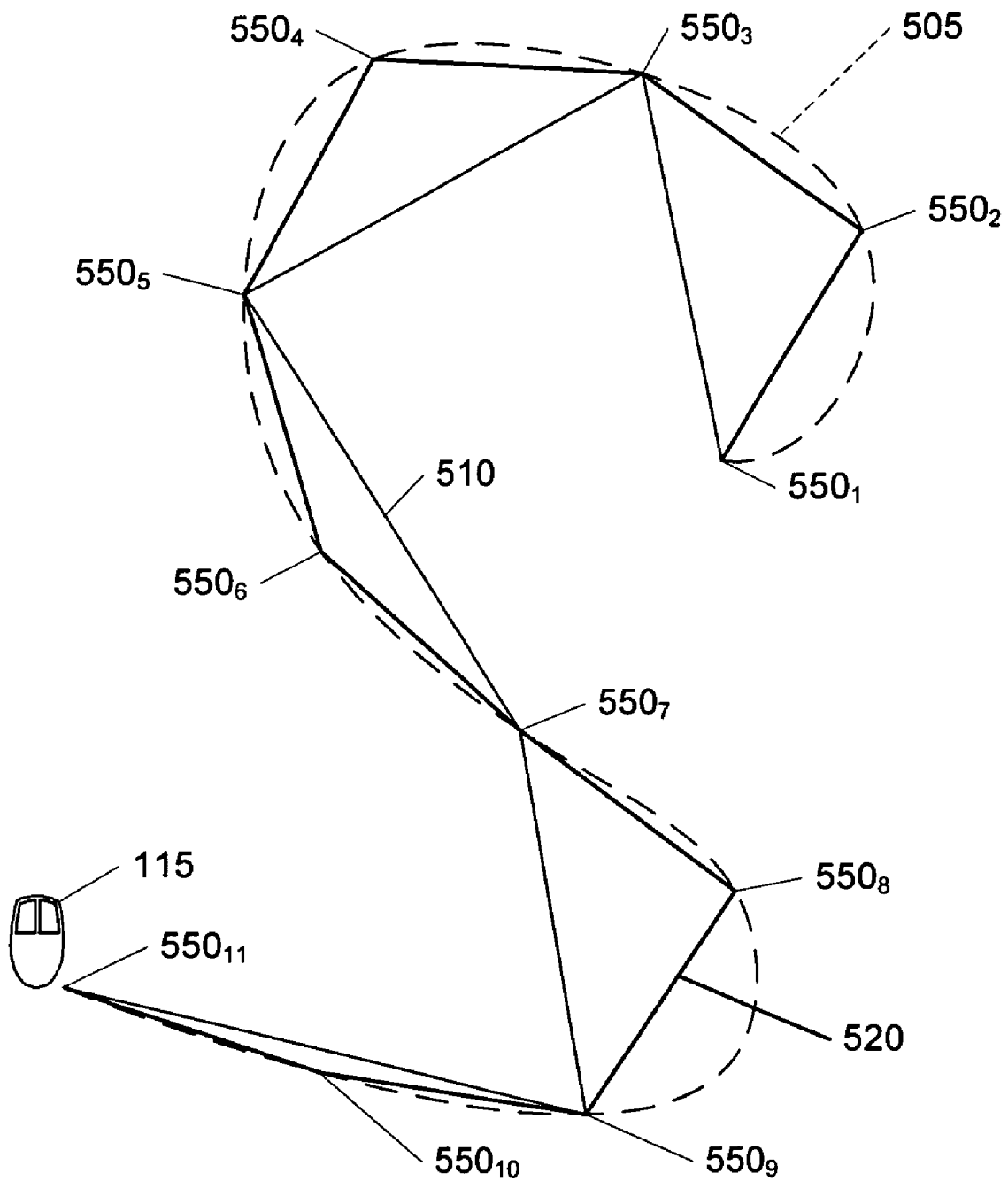
FIG. 5 illustrates the improved accuracy of a replicated motion path generated with intermediate positional data according to an illustrative embodiment.

FIG. 5 illustrates the improved accuracy of a replicated motion path generated with intermediate positional data according to an illustrative embodiment. As with FIG. 4, the wireless mouse 115 may move in an actual motion path 505 consisting of several curved segments. Replicated motion path 510 represents a path generated in accordance with current wireless transmission techniques. More specifically, positional data of points $550_1$, $550_3$, $550_5$, $550_7$, $550_9$ & $550_{11}$ is transmitted by the wireless input device to the receiving device during 6 individual transmission periods (i.e., one position point per transmission period). The 6 position points $550_1$, $550_3$, $550_5$, $550_7$, $550_9$ & $550_{11}$ represent, for example, a wireless mouse's position in each of 6 consecutive transmission periods. In comparison to the actual motion path 505, the replicated path 510 represents a less continuous representation of mouse movement. Many users may find such a representation distracting. For example, a user of a graphics application may need to draw precise lines using a mouse to control a drawing tooltip. With discontinuous representation of the mouse's movement, the user could encounter significant difficulty producing the desired lines and graphics. In order to improve the accuracy of the motion replication, a wireless mouse 115 also transmits additional data corresponding to intermediate position points $550_2$, $550_4$, $550_6$, $550_8$ & $550_{10}$ (i.e., mouse positions during the intermediate periods of non-transmission). Using the additional positional data of intermediate points $550_2$, $550_4$, $550_6$, $550_8$ & $550_{10}$ in conjunction with the positional data of points $550_1$, $550_3$, $550_5$, $550_7$, $550_9$ & $550_{11}$, a much more accurate representation 520 of motion path 505 is produced.

In at least some embodiments, the intermediate position points $550_2$, $550_4$, $550_6$, $550_8$ & $550_{10}$ are detected and transmitted without modifying the report rate and without significantly affecting power consumption. More particularly, a wireless mouse 115 transmits the positional data of motion path 520 using the same report rate as that used in generating motion path 510. To achieve this, the transmission of data corresponding to the intermediate positions $550_2$, $550_4$, $550_6$, $550_8$ & $550_{10}$ is delayed until the next transmission period. For example, positional data of point $550_1$ is determined and transmitted during a first transmission period while positional data of point $550_3$ is determined and transmitted during a following second transmission period. Positional data of intermediate point $550_2$ is determined during the intermediate period between the first and second transmission periods and stored in a buffer. Accordingly, upon reaching the second transmission period, the positional data of intermediate point $550_2$ and of now current point $550_3$ are both transmitted during this transmission period. The user is thus provided with the perception of a pseudo report rate while improved power conservation is achieved by the lower actual report rate. The pseudo report rate is a reflection of a detection rate of the input device that defines the amount of intermediate user input that may be detected between two transmission periods.

Figure 6A:
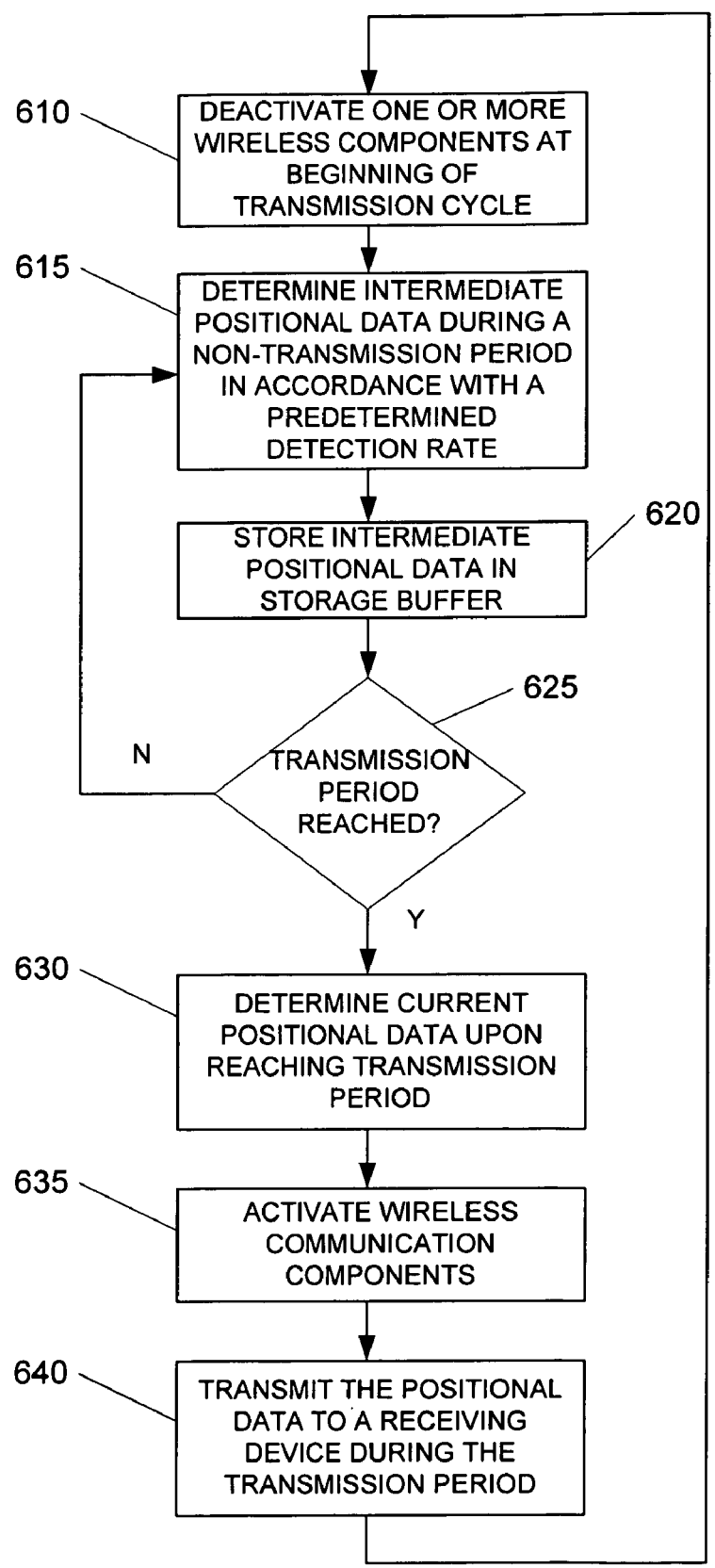
FIG. 6A illustrates a flow chart of a method for approximating the motion path of a wireless input device while reducing power consumption according to an illustrative embodiment.

FIG. 6A illustrates a flow chart of an exemplary method for more accurately depicting (on, e.g., a computer screen) the motion path of a wireless input device while reducing power consumption according to at least some embodiments.

Step 610 represents the beginning of a transmission cycle, prior to which various wireless components of the wireless input device are deactivated (i.e., powered down). In step 615, the wireless input device determines positional data corresponding to intermediate user input according to a predetermined detection rate while waiting for the next transmission period. In the example of a wireless mouse, intermediate user input may represent changes in the position of the mouse during intermediate periods of non-transmission between two consecutive transmission periods. For example, the detection rate may be set at 10 ms for a transmission cycle having a 20 ms report rate. Such a detection rate would permit a wireless input device to detect and store data of a single intermediate user input detected by the device (20 ms/10 ms=2; transmission occurs around the 20 ms mark so the current position detected at transmission time does not count as an intermediate position). Once the wireless input device determines the intermediate positional data of the detected user input, the data may be stored in a storage buffer in step 620.

The wireless input device at step 625 then determines whether it has reached the transmission period of the transmission cycle. If the transmission period has not yet been reached, the wireless input device returns to step 615 to continue detecting and storing intermediate positional data according to the predefined detection rate. Throughout steps 615-625, the wireless components remain in a deactivated state. If the transmission period has been reached, however, the wireless input device will determine current positional data corresponding to a current user input (e.g., current change in position of the device) at transmission time in step 630. Once the current positional data has been determined and stored, the wireless communication components are activated (i.e., powered up) in step 635. In step 640, both the intermediate positional data and the current positional data are transmitted to a receiving device (e.g., PC 100, PDA 101) during one or more transmit time slots of the transmission period. Upon expiration of the transmission period, the wireless components are again deactivated, and the transmission cycle of the wireless device restarts at step 610.

Thus, by transmitting both intermediate positional data and current positional data during the transmission period, the receiving device may produce a more accurate representation of the motion of the wireless device without having to increase the actual report rate.

Figure 6B:
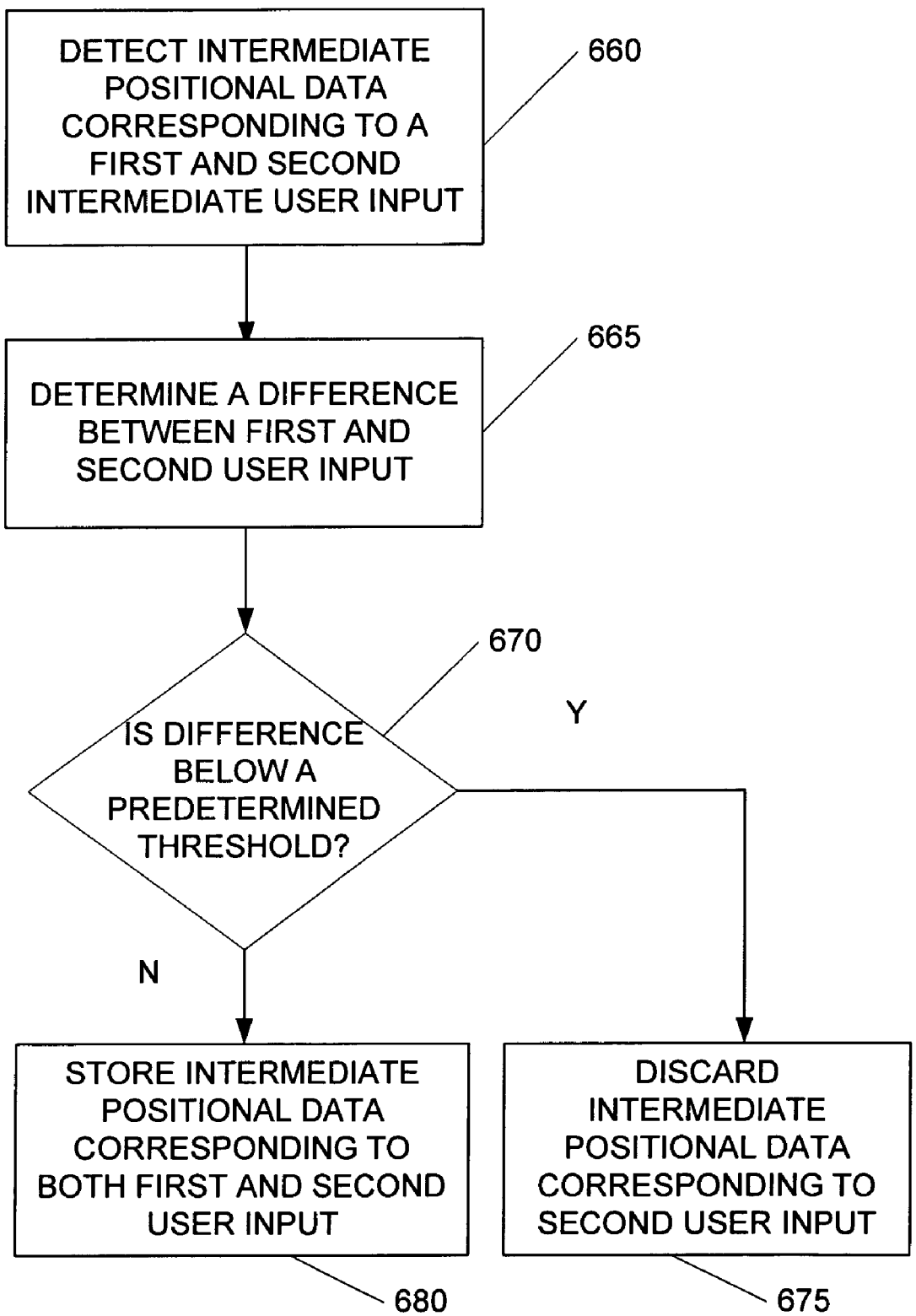
FIG. 6B illustrates a flow chart of a method for selective storage of intermediate positional data according to an illustrative embodiment.

In various embodiments, the wireless input device selectively stores and transmits intermediate positional data rather than storing and transmitting data corresponding to all detected intermediate user input. FIG. 6B illustrates one exemplary method of performing steps 615 and 620 of FIG. 6A in more detail. In FIG. 6B, a wireless input device determines and stores positional data for a first intermediate user input (e.g., a first change in the device's position) and positional data for a subsequent second intermediate user input (e.g., a second change in the device's position) in step 660. In step 665, the input device then determines a difference between the first and second user input. For example, the difference may be a degree of change between the first and second user input. If the difference is significant, the positional data corresponding to the second intermediate user input will be stored in step 680. However, if the difference is below a predefined threshold, the data corresponding to the second intermediate user input may be discarded in step 675.

Figure 7:
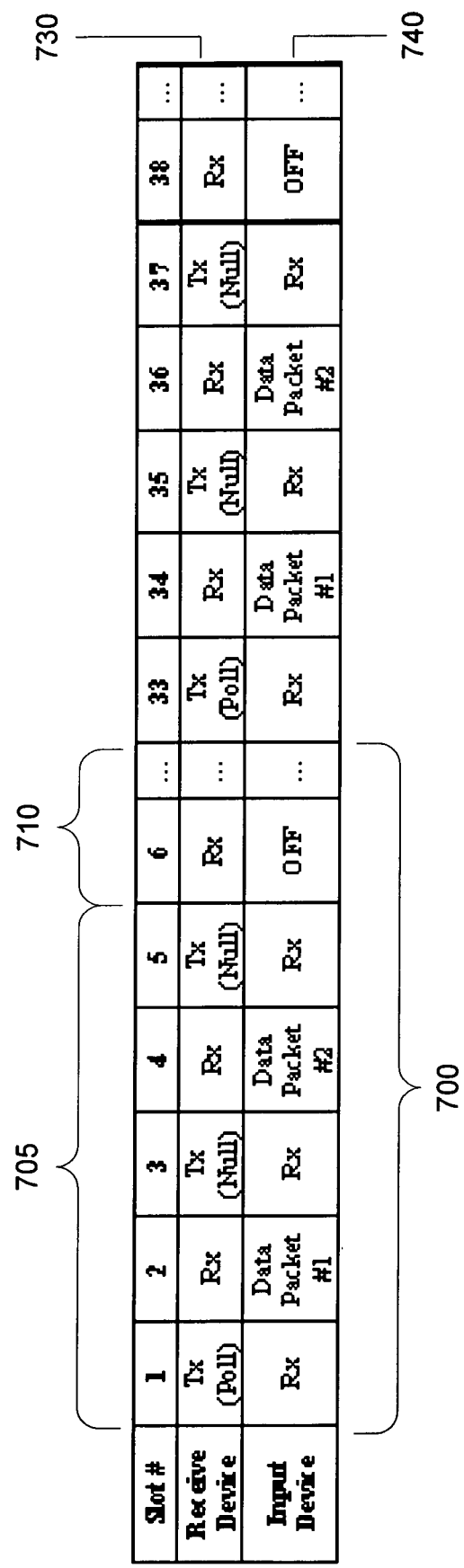
FIG. 7 illustrates a transmission schedule of the method described in FIG. 6A according to an illustrative embodiment.

FIG. 7 illustrates multiple transmission cycles in accordance with the method described in FIG. 6A according to an illustrative embodiment. Similar to FIG. 3, the top status row 730 of FIG. 7 corresponds to the activity and status of a master device, while the lower status row 740 corresponds to the activity and status of an input device, or a slave device, such as a wireless mouse. Additionally, the report rate of transmission cycle 700 is set at 20 ms, one-half of the report rate described in FIG. 3. Consequently, each transmission cycle 700 consists of 32 time slots of 625 μs length (i.e., 20 ms/625 μs=32), rather than 16. As discussed with respect to FIG. 5, the combination of a 10 ms detection rate and a 20 ms report rate allows for the detection and storage of additional positional data corresponding to intermediate user input. The data corresponding to the intermediate user input (i.e., Data Packet #1, during transmission period 705) may be transmitted along with the current user input (i.e., Data Packet #2, during transmission period 705) detected by the wireless device during transmission period 705. To transmit 2 sets of positional data, however, the transmission period would use 5 time slots, instead of the 3 described with respect to previous techniques. Transmit and receive time slots generally alternate so as to allow a receiving device to confirm receipt of the transmitted data. For example, in time slots 1, 3 and 5 the wireless input device is in a receiving state, whereas in time slots 2 and 4, the device may transmit the intermediate and current positional data, respectively. Alternatively, 2 sets of positional data may be combined into one data packet and sent during a single time slot (i.e., time slot 2), if enabled by the device's protocol. In some embodiments, time slots 3 and 5 which immediately follow slots 2 and 4, respectively, are used by the receiving device to notify the input device if a particular data packet was not received. In response to a notification of non-receipt, the input device may use an additional time slot to retransmit the lost data, including a time slot from the intermediate period of non-transmission 710. The intermediate period of non-transmission 710 spans from time slot 6 to time slot 32. Even though the number of time slots required for transmission and reception has increased, the overall ratio of transmission to non-transmission time slots is reduced. More specifically, instead of dedicating 3 out of every 16 time slots to communication activity (e.g., listening, receiving or transmitting), a wireless input device may now limit such activities to 5 slots out of every 32. This represents a 16.7% reduction in the amount of time various components of an input device are active (i.e., powered). Alternatively, if the transmission protocol enables the combination of 2 sets of positional data into one data packet, then, instead of dedicating 3 out of every 16 time slots to transmissions, a wireless input device may now limit transmissions to 3 slots out of every 32. This would represent a 50% reduction in the amount of time various components of an input device are active.

In one exemplary embodiment, data corresponding to an intermediate user input may not be recorded if there is insignificant user activity (i.e., no movement or very little movement, as described with respect to FIG. 6B). For example, if data corresponding to an intermediate user input indicates that a wireless mouse is idle, then the data may be disregarded (i.e., not stored). In such a case, only the data corresponding to a current user input would need to be sent at transmission time. The wireless components of the input device would then need to be activated for only 3 time slots rather than 5. Thus, a wireless input device using this additional feature of the power conservation technique would realize a 33.3% reduction in the amount of time various components of an input device are active.

Additionally, the wireless input device may store data of more than one intermediate user input. For example, instead of storing data of intermediate positions of a wireless mouse at 10 ms intervals, a wireless mouse may detect and store positional data of intermediate positions at 5 ms intervals. In a wireless mouse system implementing a 20 ms report rate, this would result in the transmission and storage of 3 intermediate positions rather than 1.

Figure 8:
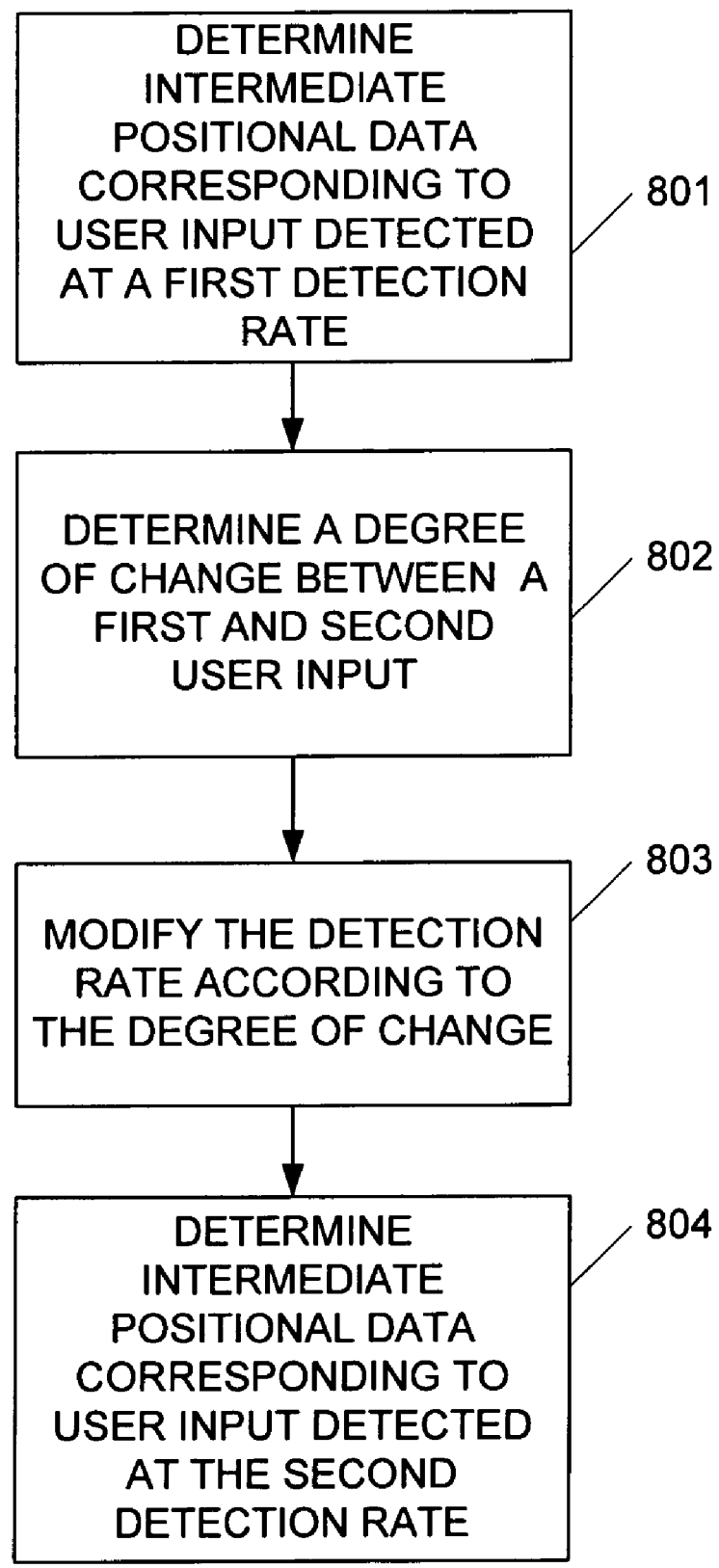
FIG. 8 illustrates a flow chart of a method for adapting the detection rate to a degree of positional change according to an illustrative embodiment.

In FIG. 8, the detection rate of a wireless input device adapts to detected or stored positional data according to various embodiments. More specifically, the detection rate is adapted to the user input detected by the wireless input device. In step 801, the input device detects intermediate data at an initial detection rate. In step 802, a first user input and a second user input are evaluated to determine a degree of change. For example, if a user moves a mouse quickly across a desk, the level of change between the two sets of user input will probably be significant. Conversely, if the user is moving a mouse slowly, the degree of change may be small. In response to this determination, the wireless input device may choose to modify the detection rate in accordance with the level of change in step 803. The wireless input device would then detect additional intermediate data at the modified detection rate in step 804.

Many of the features and embodiments described herein are related to user input received via a wireless mouse. For example, many descriptions relate to converting a user input (i.e., mouse movements) into positional data (i.e., a change from a previous position). However, many other input forms may benefit as well. The same or similar methods and systems could be applied to any input devices (e.g., keyboards, game controllers, etc.) using an RF protocol with a report rate. For example, in many first-person video games, movement and actions of an on-screen character may be controlled using a combination of buttons on a keyboard. As such, a wireless keyboard implementing the methods and system described herein may send intermediate input data corresponding to changes in button depressions (or data related to the continuous depression of a single button) during a single transmit period. The intermediate input data may further represent a speed of change in button depressions, an amount of time a button has been depressed and/or combinations thereof. Thus, the described methods and systems are not limited to the transmission and detection of positional data, but may encompass any form of input data. In addition, the aforementioned systems and methods of power conservation may also be used in conjunction with other forms of motion data (i.e., data related to movement or motion detected or received by the input device). For example, a touchpad receives user input in the form of a user's finger movements on the surface of the touchpad. Upon detecting such user input, a touchpad determines positional data corresponding to the user's finger movements and transmits the positional data to a receiving device. Similarly, in a trackball device, the device may determine positional data corresponding to the rotational input of a user (e.g., degree of ball rotation).

Furthermore, while the system and method of power conservation in wireless input devices has been described, in part, with respect to the BLUETOOTH protocol, the system and method may also be applied to other wireless transmission protocols and techniques. Other wireless transmission systems using an RF network may similarly implement the power saving transmission techniques described herein. In addition, much of the description regarding the BLUETOOTH transmission protocol is based on the use of a 16 slot SNIFF period. However, such a SNIFF period is only used by way of example and is not meant to define or limit the number or duration of slots that may be used. One of skill the art will appreciate that the number of SNIFF slots may be modified by altering slot length, the report rate and the like.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A method for operating a wireless input device configured to detect user input, wherein the wireless input device includes one or more wireless components that are powered from an internal power source of the wireless input device, said method comprising:
    deactivating the one or more wireless components of the input device during a non-transmission period of a wireless data transmission cycle, wherein deactivating includes powering down the one or more wireless components of the input device;
    determining intermediate data corresponding to intermediate user input during the non-transmission period of the wireless data transmission cycle, wherein determining intermediate data during the non-transmission period of the wireless data transmission cycle is performed in accordance with a predetermined detection rate, said predetermined detection rate having an initial detection rate, and the predetermined detection rate adapts to a speed of user input detected by the input device;
    storing the intermediate data in a storage buffer;
    determining a difference between a first intermediate user input in the stored intermediate data and a second intermediate user input in the stored intermediate data, wherein the second intermediate user input is detected after the first intermediate user input during the non-transmission period of the wireless data transmission cycle,
    discarding the stored intermediate data corresponding to the second intermediate user input from the storage buffer if the determined difference between the first intermediate user input and the second intermediate user input is below a predefined threshold,
    determining current data corresponding to a current user input upon reaching a transmission period of the wireless data transmission cycle;
    activating the one or more wireless components upon reaching the transmission period of the wireless data transmission cycle, wherein activating includes powering up the one or more wireless components; and
    transmitting the stored intermediate data and the current data to a receiving device during the transmission period of the wireless data transmission cycle.

2. The method of claim 1, wherein the non-transmission period of the wireless data transmission cycle is defined by a period between two consecutive transmission periods.

3. The method of claim 1, wherein the intermediate data and the current data comprise positional data.

4. The method of claim 1, wherein the transmission period of the wireless transmission cycle occurs according to a predetermined report rate.

5. The method of claim 1, wherein storing the intermediate data in a storage buffer further comprises:
- determining a difference between a first user input and a second user input, wherein the second user input is detected after the first user input during the non-transmission period of the wireless data transmission cycle; and
- discarding intermediate data corresponding to the second user input if the difference between the first user input and the second user input is below a predefined threshold.

6. A wireless user input device, comprising:
- a transceiver for transmitting data over a wireless communication network;
- a processor; and
- memory storing computer readable instructions, that, when executed by the processor, cause the input device to perform steps that include:
  - deactivating at least part of the transceiver during a non-transmission period of a wireless data transmission cycle, wherein deactivating includes powering down the at least part of the transceiver;
  - determining intermediate data corresponding to intermediate user input during a non-transmission period, of the wireless data transmission cycle, wherein determining intermediate data during the non-transmission period of the wireless data transmission cycle is performed in accordance with a predetermined detection rate and the predetermined detection rate adapts to a speed of user input detected by the input device,
  - storing the intermediate data in a storage buffer,
  - determining a difference between a first intermediate user input in the stored intermediate data and a second intermediate user input in the stored intermediate data, wherein the second intermediate user input is detected after the first intermediate user input during the non-transmission period of the wireless data transmission cycle,
  - discarding the stored intermediate data corresponding to the second intermediate user input from the storage buffer if the determined difference between the first intermediate user input and the second intermediate user input is below a predefined threshold,
  - determining current data corresponding to a current user input upon reaching a transmission period of the wireless data transmission cycle,
  - activating the transceiver upon reaching the transmission period of the wireless data transmission cycle, wherein activating includes powering up the transceiver, and
  - transmitting the stored intermediate data and the current data to a receiving device during the transmission period of the wireless data transmission cycle.

7. The wireless input device of claim 6, wherein the intermediate data and the current data comprise positional data.

8. The wireless input device of claim 7, wherein the intermediate data and the current data comprise changes in position of the input device along a first axis of a surface and changes in position of the input device along a second axis of the surface during the non-transmission period of the wireless data transmission cycle.

9. The wireless input device of claim 6, wherein the transmission period of the wireless data transmission cycle occurs according to a predetermined report rate.

10. The wireless input device of claim 6, wherein the processor is configured to determine intermediate data at a predetermined detection rate.

11. The wireless input device of claim 6, wherein storing the intermediate data in a storage buffer further comprises:
- determining a difference between a first user input and a second user input, wherein the second user input is detected following the first user input during the non-transmission period of the wireless data transmission cycle; and
- discarding intermediate data corresponding to the second user input if the difference between the first user input and the second user input is below a predefined threshold.

12. A computer readable storage medium storing computer executable instructions that, when executed by a processor, cause a wireless input device configured to detect user input to perform steps that include:
- deactivating one or more wireless components of the wireless input device during a non-transmission period of a wireless data transmission cycle, wherein deactivating includes powering down the one or more wireless components of the input device;
- determining intermediate data corresponding to intermediate user input during the non-transmission period of the wireless data transmission cycle, wherein determining intermediate data during the non-transmission period of the wireless data transmission cycle is performed in accordance with a predetermined detection rate, said predetermined detection rate having an initial detection rate, and the predetermined detection rate adapts to a speed of user input detected by the input device;
- storing the intermediate data in a storage buffer;
- determining a difference between a first intermediate user input in the stored intermediate data and a second intermediate user input in the stored intermediate data, wherein the second intermediate user input is detected after the first intermediate user input during the non-transmission period of the wireless data transmission cycle,
- discarding the stored intermediate data corresponding to the second intermediate user input from the storage buffer if the determined difference between the first intermediate user input and the second intermediate user input is below a predefined threshold,
- determining current data corresponding to a current user input upon reaching a transmission period of the wireless data transmission cycle;
- activating the one or more wireless components upon reaching the transmission period of the wireless data transmission cycle, wherein activating includes powering up the one or more wireless components; and
- transmitting stored intermediate data and current data to a receiving device during the transmission period of the wireless data transmission cycle.

13. The computer readable storage medium of claim 12, wherein the transmission period of the wireless data transmission cycle corresponds to a predetermined report rate.

14. The computer readable storage medium of claim 12, wherein the non-transmission period of the wireless data transmission cycle corresponds to a predetermined detection rate.

* * * * *

UNITED STATES PATENT AND TRADEMARK OFFICE
CERTIFICATE OF CORRECTION

PATENT NO.       : 7,664,537 B2                                    Page 1 of 1
APPLICATION NO. : 11/298571
DATED            : February 16, 2010
INVENTOR(S)      : Albulet et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1070 days.

Signed and Sealed this

Thirtieth Day of November, 2010

David J. Kappos
*Director of the United States Patent and Trademark Office*